United States Patent [19]

deGyarfas

[11] Patent Number: 5,240,419

[45] Date of Patent: Aug. 31, 1993

[54] CONDITION MONITOR REQUEST PROCESSING SYSTEM

[75] Inventor: Victor S. deGyarfas, Upland, Calif.

[73] Assignee: Hughes Training, Inc., Arlington, Tex.

[21] Appl. No.: 736,271

[22] Filed: Jul. 15, 1991

[51] Int. Cl.⁵ .......................... G09B 9/00; G09B 9/34; G06F 15/20; G06F 15/60

[52] U.S. Cl. ................... 434/322; 434/335; 434/323; 434/118; 434/219; 364/578

[58] Field of Search ............. 434/322, 323, 335, 350, 434/29, 30, 38, 43, 45, 47, 65, 118, 219; 364/578

[56] References Cited

U.S. PATENT DOCUMENTS

| | | | |
|---|---|---|---|
| 4,701,130 | 10/1987 | Whitney et al. | 434/118 |
| 4,787,024 | 11/1988 | Allsop et al. | 434/30 |
| 5,017,141 | 5/1991 | Relf et al. | 434/29 |
| 5,136,528 | 8/1992 | Fordham et al. | 364/578 |

FOREIGN PATENT DOCUMENTS 0483992  5/1992  European Pat. Off. .

OTHER PUBLICATIONS

Wenger, E. *Artificial Intelligence and Tutoring Systems* Morgen Kaufman, Los Altos; US, Chapter 5, "Interactive Simulations: Communicating Mental Models", pp. 79-88, 1987.

Wilson, Lois S. et al., "Simulating Simulators with Computer Based Training", Proceedings of IEEE 1988 National Aerospace and Electronics Conference, NAECON 1988, pp. 1000-1005.

Randen, Kenneth, "Full-scale nuclear power plant training simulator B1", ASEA Journal vol. 51 No. 5 1978 pp. 122-126.

*Primary Examiner*—Jessica J. Harrison
*Attorney, Agent, or Firm*—Wanda K. Denson-Low

[57] ABSTRACT

An interactive training system (10) for simulating an operating environment. The system (10) can operate in both freeplay and procedural modes. The system (10) includes a plurality of simulated displays (18) simulating actual displays in the operating environment. The simulated displays (18) indicate the state of various components of the operating environment to the user. A plurality of manipulable input devices (20) permits the user to interact with the training system (10). Simulation software (22) responds to the input devices (20) and controls the displays in response thereto. Procedure monitoring software (26) determines the status of the input devices as a result of the user's manipulation of the input devices. Condition monitoring software (24) monitors conditions within the procedure monitor (26) and simulation software (22). These conditions may occur directly or indirectly as a result of the manipulation of the input devices (18) by the user. This system (10) simplifies the monitoring of complex user actions.

18 Claims, 3 Drawing Sheets

CONDITION MONITOR REQUEST PROCESSING SYSTEM

BACKGROUND OF THE INVENTION

1. Technical Field

This invention relates to simulation and training systems, and more particularly to an interactive simulating system capable of monitoring internal conditions.

2. Discussion

Simulation systems which permit a person to experience the operation of a complex operating environment have proven useful for both training and recreational applications. For example, various kinds of simulators have been developed to train operators of ground and airborne vehicles because of the high cost of using actual vehicles during training. In pilot training, hardware mockups of an aircraft cockpit, coupled with a computer generated simulated view, are frequently employed to give new pilots experience with the myriad controls and situations they will encounter when operating actual aircraft.

There are two main kinds of simulation systems, procedural trainers, and freeplay trainers. Procedural trainers are those in which a student is walked through a fixed series of procedural steps that require him/her to push buttons, flip switches, etc., in a predetermined manner. This teaches the student the specific series of steps that must be performed in a particular situation. These procedural steps can be defined and monitored in software called courseware.

Procedural trainers are useful because they permit the student to learn and memorize a fixed procedure that must be performed by rote in given situations. For example, in flight simulators, a procedural simulator may be use to teach the pilot the required steps to perform when the engines of the aircraft are on fire. These steps should be implemented by the pilot virtually automatically and will rarely deviate from the fixed procedure.

One disadvantage with procedural trainers is that while they do teach students predetermined procedures, they do not provide a realistic experience of the operation of the simulated system. That is, they do not give the student a deep understanding of the operation of the system to permit him to cope with situations which he hasn't been taught about previously.

Another problem with procedural trainers is that the courseware for a procedural trainer is very time consuming to author because of the level of detail that must be specified. In this regard, while monitoring states of various switches is relatively straightforward for the courseware in a procedural trainer, when it is desired to monitor a combination of switch actions, and those switch actions themselves are subject to cancellation and correction by the user, the required courseware becomes much more complex and difficult to author.

For example, if it is desired to monitor the result of switch actions rather than the switch actions themselves, monitoring becomes very difficult. Examples of this would include the task of monitoring a cursor position based on switch actions that control the cursor, or monitoring simulated engine RPM based on throttle position. This is because engine RPM may vary depending on other factors besides throttle position and may also be subject to a time lag between movement of the throttle and resulting engine RPM. As a result, in conventional simulation systems, separate software routines must be written by the simulation developer to monitor each thing that is monitored.

Freeplay trainers, on the other hand, permit a student to experiment with the simulated system to gain a deeper understanding of its operation. A student may first be taught a number of procedures using a procedural trainer and then it may be desirable to let the student experiment in a freeplay environment where he can try things out to see how the system responds. However, freeplay trainers do not direct the student in the kinds of structured training exercises that are often necessary to insure that a student has mastered certain tasks. Unfortunately, prior simulation systems for complex operating environments, have not permitted both procedural and freeplay operation.

Thus, it would be desirable to have a single simulation system which permits both freeplay and procedural training modes. Further, it would be desirable to provide a simulation system which, in a procedural training mode, can monitor conditions without monitoring individual switch states. That is, it would be desirable to have a procedural trainer which can operate by monitoring internal states of the software that implement a procedure, rather than monitoring an external state of a switch or other input device.

SUMMARY OF THE INVENTION

Pursuant to the present invention, an interactive simulation system is provided for simulating an operating environment which can operate in both freeplay and procedural modes. The system includes a plurality of simulated displays simulating actual displays in the operating environment, where the simulated displays indicate the state of various components of the operating environment to the user. In addition, the system includes a plurality of manipulable input devices permitting the user to interact with the simulation system. The system also includes simulation software for responding to the input devices and for controlling the displays in response thereto, these responses providing a simulation of actual response in the operating environment. Also, procedure monitoring software in the system determines the status of the input devices as a result of the user's manipulation of the input devices. Condition monitoring software monitors conditions within the procedure monitor and simulation software, these conditions occurring directly or indirectly as a result of the manipulation of the input devices by the user. The result is a simulation system which simplifies the monitoring of complex user actions.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
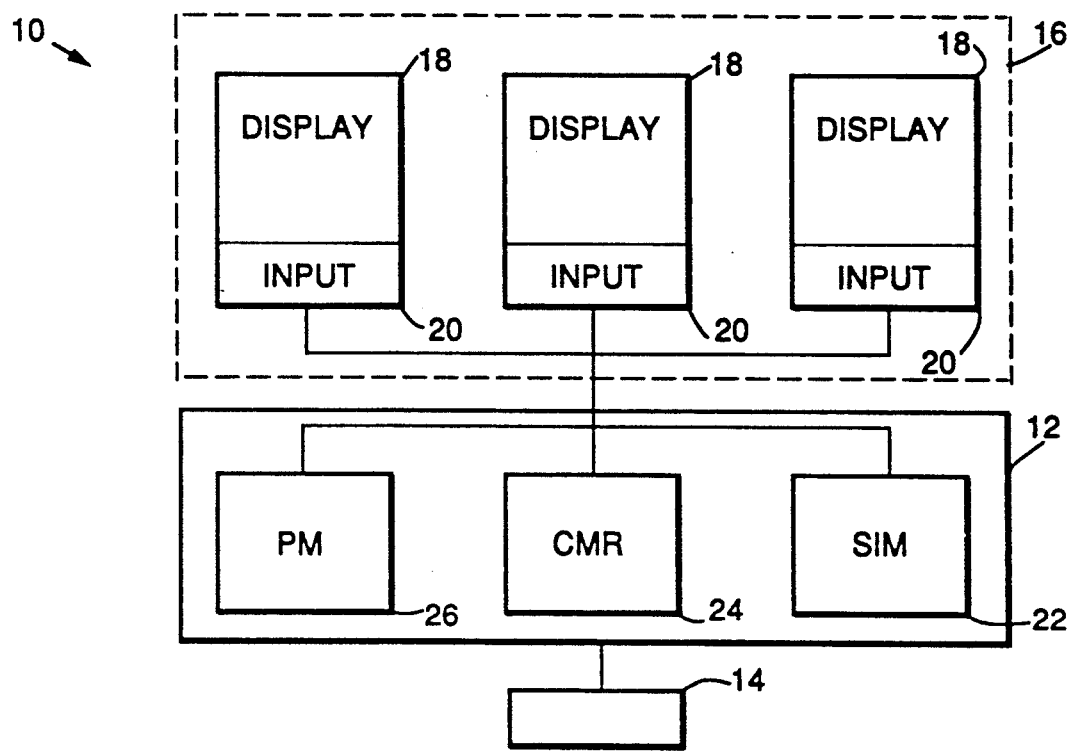
FIG. 1 is a diagram of the overall condition monitor request processing system in accordance with the present invention.

An overall system block diagram of the main components of the condition monitor request training system 10, in accordance with the present invention is shown in FIG. 1. The system includes a host computer 12, a terminal 14 and a simulation system 16. The simulation system 16 includes a plurality of display devices 18 which may include CRT's, a simulated cockpit, gages, meters, etc. as well simulated exterior views having still and/or moving images. The simulation system 16 also includes a plurality of input devices 20 which may include switches, buttons, keypads, levers, etc., which are actuatable by the user.

Figure 3:
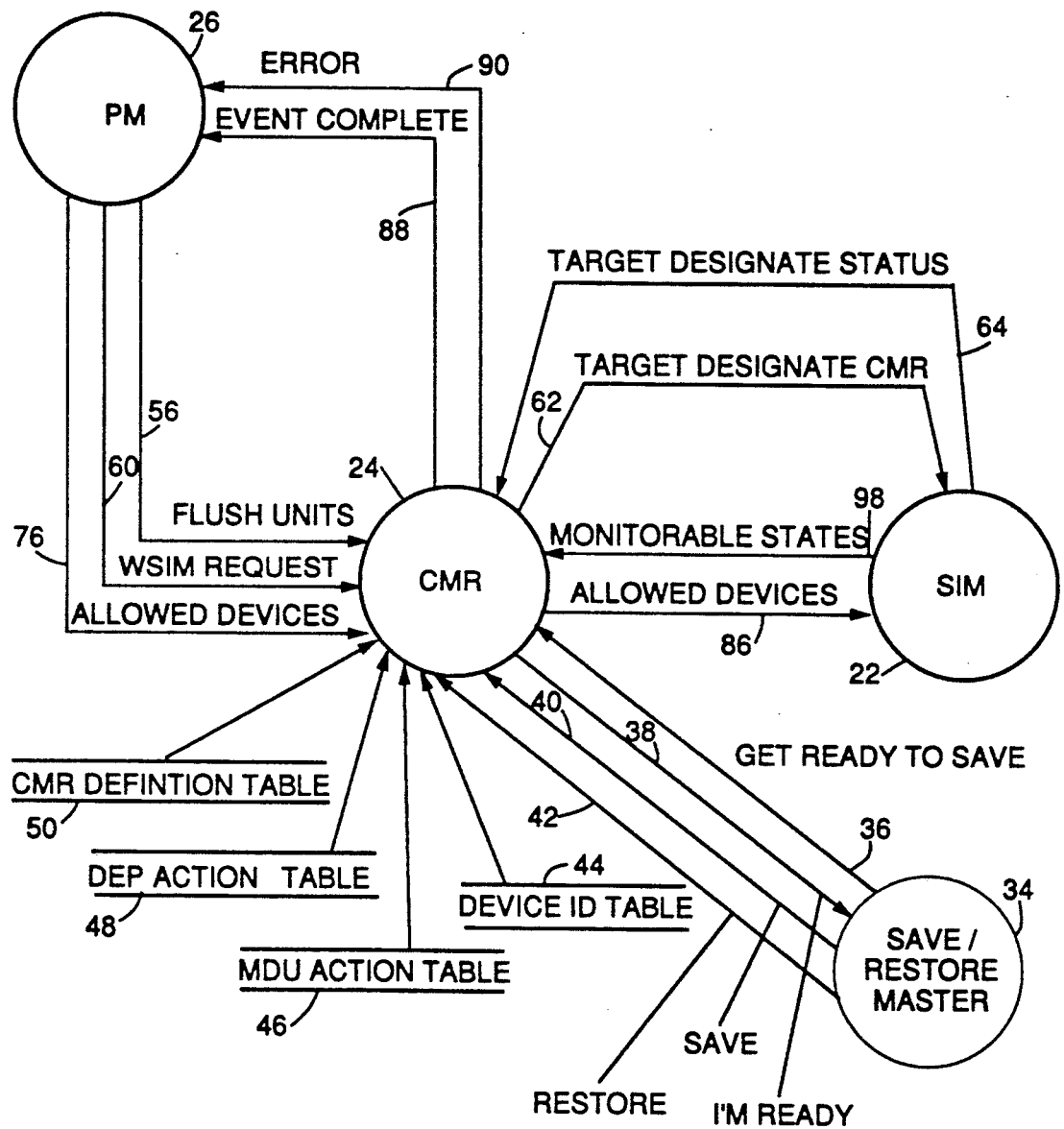
FIG. 3 is a diagram of the data flow into and out of the condition monitor request software.
Figure 4:
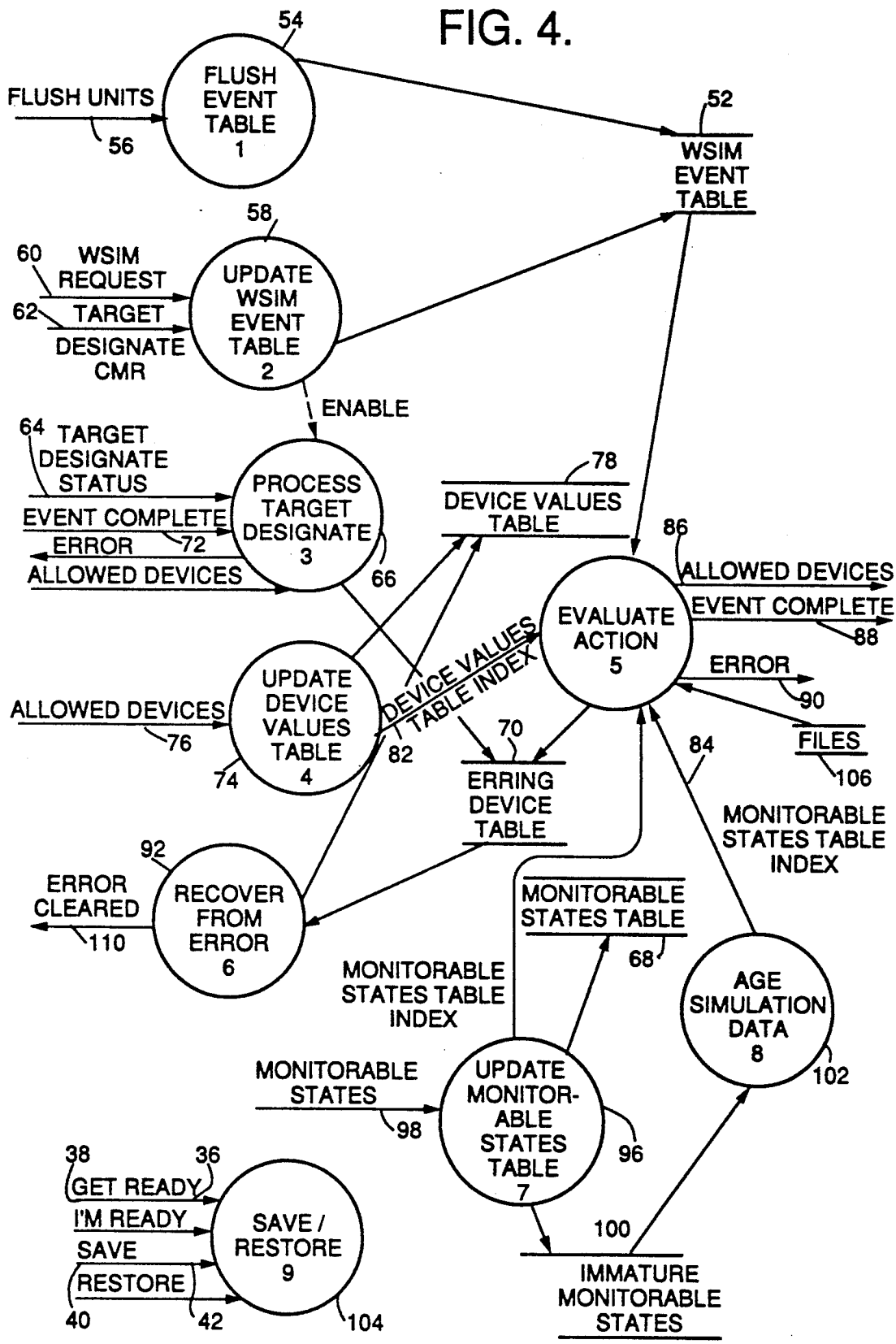
FIG. 4 is a diagram of the data flow within the condition monitor request software.

The simulation system 16 is controlled by a simulation software program 22 which may be located in the host computer 12. Also, condition monitor request software 24 and procedure monitor software 26 are contained in the host computer. The terminal 14 can be used to enter and edit each of the programs 22, 24 and 26 in the host computer. It will be appreciated that many variations on the configuration shown in FIG. 1 are possible within the scope of the present invention. Further details of the condition monitor 24, Simulation 22, and procedure monitor software 26 are shown in FIGS. 2-4.

In general, the condition monitor request (CMR) software 24 monitors simulation states with respect to procedural actions to determine when procedural events have been satisfied. The CMR software 24 will monitor states of the training system 10 relevant to procedural segments which the procedure monitor software 26 cannot monitor. Procedural segments are portions of larger training exercises called lessons which the training system 10 implements by means of its courseware. Courseware software is generally located in the host computer 12. Courseware is a type of database which specifies the actions and conditions that are to be achieved using the trainer.

The reason the procedure monitor software 26 cannot monitor certain states is because it is only capable of monitoring switch actions and not complex combinations of switch actions. Thus, for example, if it is desired to know when the student presses certain switches to select a communication channel, for example, defined by the numbers 23.000, the procedure monitor software 26 must have a procedure to determine if the number 2 is pressed, and then 3 and then 0.000, etc. Of course, if anytime along the way the student presses the clear button, the procedure monitor software 26 must have procedures written to go back to the beginning and wait for these numbers to be pressed again. Because this process is too difficult to handle in this manner, the CMR software 24 is provided to monitor the complex combination of switch actions and then to simply determine when the communication channel gets to the state 23.000. The states monitored by the CMR 24 are typically combinations of switch states and internal simulation states.

Figure 2:
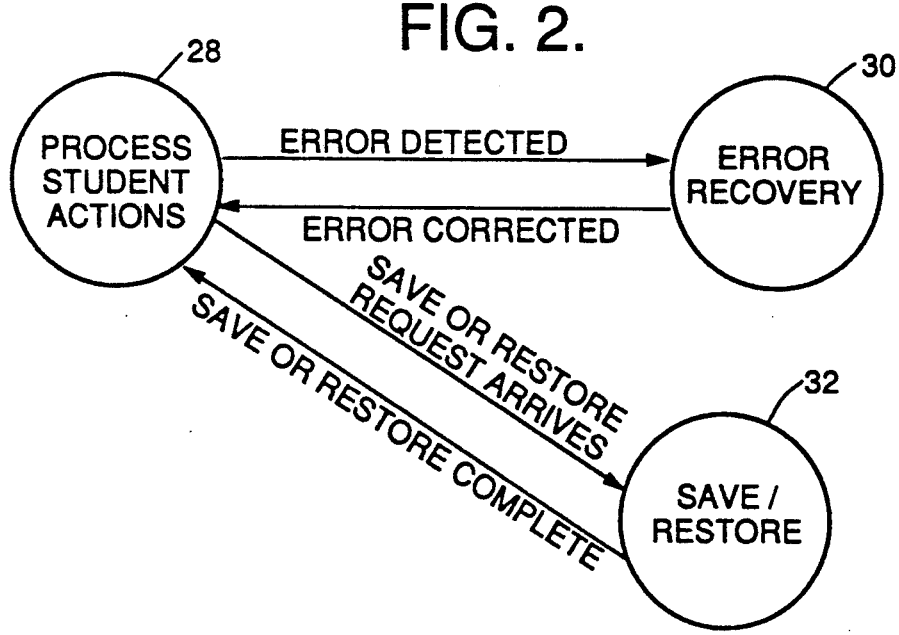
FIG. 2 is a diagram of the condition monitor request software transition states.

FIG. 2 is the state transition diagram for the CMR software 24. As shown in FIG. 2, the CMR software 24 is in one of three states during operation. It is either processing student actions, indicated by state 28; or, when errors are detected, CMR software 24 goes into the error recovery state 30 until the error is corrected; or, the CMR software 24 is in the save/restore state 32, which it enters upon the receipt of a save/restore request. Save and restore requests are used to save the current state of the CMR software and then restore the saved state at a future point in time.

As shown in FIG. 3, a save/restore master 34 software first produces a get ready to save request 36 for the CMR. The CMR then sends an I'm ready response 38 to the save/restore master 34. The save/restore master 34 then coordinates the rest of the save/restore process and then sends either a save message 40 or a restore message 42 to the CMR. Also shown in FIG. 3 are four tables; the device ID table 44; the MDU action table 46; the DEP action table 48; and the CMR definition table 50.

In more detail, the MDU action table 46 refers to a type of numerical control display called a multipurpose display unit (MDU) which consists of a monitor having a number of bezel keys around it. The MDU action table 46 is a data base of software describing all the states of each of the MDU keys. For example, the MDU may comprise one of the displays 18 and one set of switches 20 shown in FIG. 1. It will be appreciated that the MDU may have many different pages that may appear on the screen, each having text describing the function of the buttons on each page. The MDU action table 46 will then describe what the buttons do for each page of display.

Similarly, the DEP action table 48 describes the function of various buttons on another numerical control device called a Data Entry Panel, (DEP).

Similarly, the device ID table 44, contains a description of the identification and function of each device in the simulator. The term device refers to knobs, switches, and other manipulable controls. The CMR definition table 50 contains a definition of each type of condition monitor request that the CMR software 24 may receive. For example, some condition monitor requests require the CMR software 24 to determine whether or not certain keys which are pressed by the student are allowed or not. At other times, the task of the CMR 24 is simply to look for a particular state, and the switches that are pressed to reach that state are ignored. For example, the CMR 24 may simply look for the engine RPM of an aircraft reaching 80%. Thus, the CMR definition table 50 tells the CMR software 24 how to interpret any requests it receives from the courseware.

Also, shown in FIG. 3 are the kinds of interactions between PM 26 and CMR 24 and between SIM 22 and CMR 24. Further details of these interactions will now be discussed in connection with FIG. 4, which illustrates the data flow diagram internal to the CMR software 24. A wait for simulation (WSIM) event table 52 is an internal structure which contains all of the events which the courseware specifies should be monitored. All events that are still outstanding that is, which have not been satisfied by the student, are kept in the WSIM event table 52. Once events have been satisfied, a flush event table function 54 removes that event from the WSIM event table 52. It does this by receiving a flush units input 56 from the procedure monitor 26 and by removing all entries in the WSIM event table 52 which have a unit number less than or equal to the unit number specified in the flush units input. An update WSIM table function 58 will add a specified WSIM event to the WSIM event table 52 when a WSIM request 60 is received from the procedure monitor 26.

If the WSIM request 60 was a "target designate" condition monitor request 62, the update WSIM event table function 58 will send the target designate CMR request 62 to simulation 22. The target designate condition monitor request 62 is sent to the simulation software 22, which then will report which targets have been designated. A target designate status message 64 is then sent from the simulation software to this CMR 24 where it is processed by the process target designate function 66. In particular, target designate refers to a target that is designated which may be, for example, a cursor moving around the screen. The process target designate function 66 will process the target designate status message 64. The target designate status message is used by CMR to determine whether the target designated on is the one specified by the courseware.

When the target designate status WSIM request is encountered, CMR will first set the current state of its copy of a monitorable state ID value to a state of "in progress". The monitorable state ID values identify the current state of monitorable items, for example, communication status channel or engine RPM. In this way, CMR has a table of what is currently being looked at. The monitorable states are stored in a monitorable states table 68. Next, the process target designate function 66 will send an environmental parameter for target designate to the PM 26 to simulation. The environmental parameter for target designate is an identifier which indicates that targets which are designated should be reported to CMR. The data for the environmental parameter will be the target to designate. When the monitorable state ID for the target designate status message is received by the process target designate function 66, it will send the error message to PM 26, update and erring device table 70 and go to the error recovery state 30 if target designate status message indicates an error. The erring device table is used to indicate which devices have been moved out of their required positions. If the target designate status message does not indicate an error, the process target designate 66 will send event complete message 72 to PM 26.

The update device values table 74 receives an allowed devices message 76 from the PM 26 and will update a device values table 78 and prompt an evaluate action function 80 to run. The allowed device message is generated by PM 26 to indicate that a device has been moved from one position to another. Device values table 78 is a table of the state of the buttons in a particular device that CMR is interested in monitoring.

Evaluate action function 80 is activated when it receives a device table index (along line 82) or monitorable states table index (along line 84) indicating which device or monitorable state has changed state. The evaluate action function 80 determines whether a student action is allowed, and if an action is allowed, whether or not the action starts an event or completes an event. Evaluate function 80 also determines whether or not a monitorable state starts or completes an event. When an allowed action occurs, the state of the allowed device will be passed on to simulation 22 along the allowed devices line 86.

If the action or state completed an event, an event complete indicator will be sent to simulation along line 88. If an action occurs which is not allowed, the device producing the action will not be passed onto simulation 22, but an error indication will be sent to PM 26 along line 90; the erring device table will be updated; and CMR will go into the error recovery state.

The evaluate action function 80 processes a number of types of condition monitor requests including:

a) multi purpose display unit (MDU) CMR's, which are activated actions on MDU bezel buttons or by the results of the action on other devices which are displayed on the MDU's. In accordance with one embodiment of the present invention, MDU bezel buttons are classified into three types. 1) MDU page change button, 2) MDU action buttons, and not supported buttons.

b) Data Entry Panel (DEP) CMR's which are activated through actions on DEP buttons. DEP CMR's fall into the following categories: 1) DEP page change; 2) DEP toggle actions; 3); DEP rotate actions; and 4) DEP string actions.

c) Flight Data Control Panel (FDCP) CMR's. The FDCP is a control panel having a numeric keypad.

d) Simulation to Trainer Interface (STI) CMR's. These CMR's are a catch all category for CMR's that don't involve interactions with MDU, DEP, or FDCP's. These CMR's are satisfied when a stable simulation state is present which satisfies the state that the courseware author has specified.

A set of files 106 (the MDU action table, DEP action table, CMR Definition table, and Device table) will be used by the evaluate action function 80 to determine if a particular student action is allowed at the particular point in the procedure.

The recover from error function 92 accepts allowed devices messages after an error has been detected until the erring device has been set to a position which is not incorrect. When the device has been placed in the proper position, this function will send PM 26 the error cleared indication along line 110. Recover from error function 92 will also update the device valued table 78 along line 94 whenever a new device state arrives.

The update monitorable state table 96 receives a report of a monitorable state along line 98 from simulation 22 and checks the monitorable states table 68 to determine whether the simulation state information needs to be "aged" for stability or not. That is, whether the monitorable state must be stable before it is determined that the student has actually accomplished this state. For example, if the desired state is achieving an oil pressure of 50 pounds per cubic inch, the student may move a switch causing the oil pressure to move past 50 pounds. Thus, the state has not yet been reached and it is desired to wait until a stable state is achieved. If the monitorable state does not need to be aged, the monitorable states table 68 will be updated with the new value of the monitorable state by the update monitorable states table function 96 and the evaluate action function 80 will be given an indication of which monitorable state was updated. If the monitorable state needs to be aged an immature monitorable states table 100 will be updated.

The age simulation data function 102 runs once every cycle whenever there are entries in the immature monitorable states table 100. The age simulation data function 102 will perform the following processing on every entry in the immature monitorable states table. a) increment the age of the entry, and b) determine whether the data for the entry is mature. Data is mature when its age has reached 200 milliseconds. If the entry is mature, the entry will be removed from the immature monitorable states table and placed in the monitorable states table 68. If there were any entries moved from the immature monitorable states table to the monitorable states table, the evaluate action function 80 will be given an indication on which monitorable state was updated.

The save/restore function 104 receives get ready to save message and sends the I'm ready message to the state to the save/restore master 34. Any queue messages that arrive before the save message arrives will be copied to an auxiliary queue. When the save/restore function 104 receives a get ready to save message it will save its data area into an auxiliary data area and continue normal processing. When this function receives the restore message, it will restore its data segment and copy messages from its auxiliary queue back to the primary queue.

It will be appreciated that the CMR system 10 in accordance With the present invention can be used to implement a procedural monitor or a freeplay monitor. In particular, implementation of one or the other will simply require authoring courseware which calls out procedural steps for the procedural mode, or not using courseware in the freeplay mode.

Those skilled in the art can appreciate that other advantages can be obtained from the use of this invention and that modification may be made without departing from the true spirit of the invention after studying the specification, drawings and following claims.

What is claimed is:

1. An interactive simulation system for simulating an operating environment, said simulation system comprising:
    a plurality of simulated displays simulating actual displays in said operating environment, said simulated displays indicating the state of various components of said operating environment to the user;
    a plurality of manipulable input devices permitting a user to interact with said simulation system;
    simulation software for responding to said input devices and for controlling said displays in response thereto, said responses providing a simulation of actual responses in said operating environment;
    procedure monitoring software for determining the status of said input devices as a result of the user's manipulation of said input devices; and
    condition monitoring software for monitoring conditions within said procedure monitor and simulation software, said conditions occurring indirectly as a result of the manipulation of said input devices by said user, wherein said conditions are simulated conditions within the operating environment that are not entirely determinable from the status of the input devices alone.

2. The system of claim 1 wherein said condition monitor software includes means for evaluating activities of said user in manipulating said input devices, said input devices determining future actions by said procedure monitor software and said simulation software.

3. The system of claim 2 further comprising a plurality of tables stored in databases coupled to said condition monitoring software, at least one of said tables containing a description of said input devices.

4. The system of claim 3 wherein one of said tables contains a list of events and said condition monitor software further comprises:
    a means for flushing said event table; and
    a means for updating said event table, wherein said means for evaluating actions is coupled to said event table.

5. The system of claim 3 wherein one of said tables is a device values table and said condition monitor software further comprises:
    means for updating said device values, and wherein said means for evaluating action as coupled to said means for updating said device values table.

6. The system of claim 3 wherein said condition monitoring software further comprises process target designate means for processing target designate requests.

7. The system of claim 6 wherein said target designate means further determines if devices are activated by said user were allowed by said system and if not, send an error message to said procedure monitor software.

8. The system of claim 3 wherein one of said tables contains a list of the monitorable states of said simulation hardware and software, and wherein said condition monitor software further comprises means for monitoring said monitorable states table, coupled to said means for evaluating actions.

9. A training system for training a student to utilize an operating environment, said system comprising:
    a plurality of simulated displays simulating actual displays in said operating environment, said simulated displays indicating the state of various components of said operating environment to the student;
    a plurality of manipulable input devices permitting said student to interact with said training system;
    simulation software for responding to said input devices and for controlling said displays in response thereto, said responses providing a simulation of actual responses in said operating environment;
    procedure monitoring software for determining the status of said input devices as a result of the student's manipulation of said input devices; and
    condition monitoring software for monitoring conditions within said procedure monitor and simulation software, said conditions occurring indirectly as a result of the manipulation of said input devices by said student, wherein said conditions are simulated conditions within the operating environment that are not entirely determinable from the status of the input devices alone, said condition monitor software including means for evaluating activities of said student in manipulating said input devices, said input devices determining future actions by said procedure monitor software and said simulation software.

10. The system of claim 9 further comprising a plurality of tables stored in databases coupled to said condition monitoring software, at least one of said tables containing a description of said input devices.

11. The system of claim 10 wherein one of said tables contains a list of events and said condition monitor software further comprises:
    a means for flushing said event table; and
    a means for updating said event table, wherein said means for evaluating actions is coupled to said event table.

12. The system of claim 10 wherein one of said tables is a device values table and said condition monitor software further comprises:
    means for updating said device values, and wherein said means for evaluating action as coupled to said means for updating said device values table.

13. The system of claim 10 wherein said condition monitoring software further comprises process target designate means for processing target designate requests.

14. The system of claim 13 wherein said target designate means further determines if devices are activated by said student were allowed by said system and if not, send an error message to said procedure monitor software.

15. The system of claim 10 wherein one of said tables contains a list of the monitorable states of said simulation hardware and software, and wherein said condition monitor software further comprises means for monitoring said monitorable states table, coupled to said means for evaluating actions.

16. An interactive method for simulating an operating environment, said method comprising the steps of:

providing a plurality of simulated displays simulating actual displays in said operating environment, said simulated displays indicating the state of various components of said operating environment to the user;

providing a plurality of manipulable input devices permitting a user to interact with said simulation system;

responding to said input devices controlling said displays in response thereto using simulation software, said responses providing a simulation of actual responses in said operating environment;

determining the status of said input devices as a result of the user's manipulation of said input devices using procedure monitoring software; and monitoring conditions within said procedure monitor and simulation software using condition monitoring software, said conditions occurring indirectly as a result of the manipulation of said input devices by said user, said conditions being simulated conditions within the operating environment that are not entirely determinable from the status of the input devices alone.

17. The method of claim 16 further comprising the step of evaluating activities of said user in manipulating said input devices, said input devices determining future actions by said procedure monitor software and said simulation software.

18. The method of claim 16 further comprising the step of providing a plurality of tables stored in databases coupled to said condition monitoring software, at least one of said tables containing a description of said tables containing a description of said input devices.

* * * * *